(12) United States Patent
D'Agostini et al.

(10) Patent No.: US 11,592,178 B2
(45) Date of Patent: Feb. 28, 2023

(54) SYSTEM AND METHOD OF IMPROVING COMBUSTION STABILITY IN A GAS TURBINE

(71) Applicant: Air Products and Chemicals, Inc., Allentown, PA (US)

(72) Inventors: Mark Daniel D'Agostini, Allentown, PA (US); Anup Vasant Sane, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 63 days.

(21) Appl. No.: 17/055,445

(22) PCT Filed: May 15, 2019

(86) PCT No.: PCT/US2019/032395
§ 371 (c)(1),
(2) Date: Nov. 13, 2020

(87) PCT Pub. No.: WO2019/222334
PCT Pub. Date: Nov. 21, 2019

(65) Prior Publication Data
US 2021/0222881 A1    Jul. 22, 2021

Related U.S. Application Data

(60) Provisional application No. 62/671,861, filed on May 15, 2018.

(51) Int. Cl.
*F23R 3/34*    (2006.01)
*F02C 3/06*    (2006.01)
(Continued)

(52) U.S. Cl.
CPC ............... *F23R 3/343* (2013.01); *F02C 3/06* (2013.01); *F02C 7/08* (2013.01); *F23D 14/32* (2013.01);
(Continued)

(58) Field of Classification Search
CPC .... F23R 3/34; F23R 3/343; F02C 3/06; F02C 3/20; F02C 7/08; F02C 7/10
See application file for complete search history.

(56) References Cited

U.S. PATENT DOCUMENTS 3,355,883 A * 12/1967 Beam, Jr. .................. F02C 7/14
416/198 A
3,859,787 A *  1/1975 Anderson ................. F23R 3/28
60/39.23

(Continued)

FOREIGN PATENT DOCUMENTS

EP          1909032 A2      4/2008
JP          H06212910       8/1994
(Continued)

OTHER PUBLICATIONS

European International Search Report and Written Opinion of the International Searching Authority, dated Oct. 9, 2019, for PCT/US2019/032395.

(Continued)

*Primary Examiner* — Steven M Sutherland
(74) *Attorney, Agent, or Firm* — Jason M. Ploeger

(57) ABSTRACT

A combustor for a gas turbine engine having a compressor upstream of the combustor and a turbine downstream of the combustor. The combustor also includes a combustor chamber, an oxy-fuel pilot burner (104) centrally positioned at an end of the combustor chamber, and an air-fuel premix burner configured to at least partially premix air and fuel. The (Continued)

air-fuel premix burner surrounds the oxy-fuel pilot burner (104) in an annular configuration.

11 Claims, 18 Drawing Sheets

(51) Int. Cl.
  *F02C 7/08* (2006.01)
  *F23D 14/32* (2006.01)
(52) U.S. Cl.
  CPC ...... *F05D 2220/32* (2013.01); *F05D 2240/35* (2013.01)

(56) References Cited

U.S. PATENT DOCUMENTS

| | | | |
|---|---|---|---|
| 5,220,787 A * | 6/1993 | Bulman | F02K 7/10 60/768 |
| 6,405,523 B1 | 6/2002 | Foust et al. | |
| 7,363,756 B2 | 4/2008 | Carrea et al. | |
| 2003/0054301 A1 | 3/2003 | Borders et al. | |
| 2004/0221582 A1 | 11/2004 | Howell et al. | |
| 2005/0282097 A1 | 12/2005 | Carrea et al. | |
| 2006/0035188 A1 | 2/2006 | Berenbrink et al. | |
| 2008/0083224 A1 * | 4/2008 | Varatharajan | F23R 3/346 60/748 |
| 2010/0083664 A1 * | 4/2010 | Mancini | F23R 3/14 60/752 |
| 2013/0047900 A1 | 2/2013 | Bool et al. | |
| 2013/0160423 A1 | 6/2013 | Wasif et al. | |
| 2014/0319843 A1 * | 10/2014 | Perry | F02C 3/00 60/726 |
| 2015/0260105 A1 * | 9/2015 | Nemitallah | F02C 7/22 60/39.12 |
| 2017/0191421 A1 * | 7/2017 | Spivey | F23R 3/36 |

FOREIGN PATENT DOCUMENTS

| | | |
|---|---|---|
| JP | H8014565 | 1/1996 |
| JP | H10185196 | 7/1998 |
| JP | 2002195563 | 7/2002 |
| JP | 2003217602 | 7/2003 |
| JP | 2008096099 | 4/2008 |

OTHER PUBLICATIONS

Written Opinion of the International Preliminary Examining Authority, dated Mar. 26, 2020, for PCT/US2019/032395.

* cited by examiner

SYSTEM AND METHOD OF IMPROVING COMBUSTION STABILITY IN A GAS TURBINE

CROSS-REFERENCE TO RELATED APPLICATIONS

This application claims priority from U.S. Provisional Patent Application No. 62/671,861 filed 15 May 2018, which is incorporated by reference herein in its entirety.

BACKGROUND

To the best knowledge of the inventors, the prior art literature on oxygen use in gas turbine combustors has exclusively considered bulk enrichment of the combustion air with oxygen. However, the amount of bulk oxygen enrichment of combustion air required to markedly improved combustion stability in gas turbine engines a) is not a cost-effective option for practical turbine engine operation and b) produces an increase in NOx emissions. Additionally, the combustors typically run at fuel lean conditions, therefore there is already excess oxygen present in the oxidizer stream.

The basic configuration of a gas turbine engine commonly used for industrial power generation, illustrated in FIG. 1, comprises cold section characterized by a compressor, followed by a hot section characterized by a combustor section and a turbine. The cold section includes an air intake, optionally including a set of circumferentially-spaced inlet guide vanes, followed by a multi-stage axial flow compressor that delivers high pressure air to the combustor section. The turbine, downstream of the combustor section, provides power via a shaft to drive the compressor. The operating pressure ratio of the turbine, which is defined as the pressure of the air at the compressor exit to that of the air at the compressor intake, is normally less than about 18:1.

While combustor designs vary based on manufacturer, size, and application, many, particularly those of the multiple-can type (as shown in FIG. 2) and the can-annular type (as shown in FIG. 3), carry out combustion via an array of cylindrical tubes or "cans" disposed circumferentially around the turbine shaft. The principal difference between these two combustor configurations is that in the multiple-can type combustor, each can's air intake is mechanically coupled to a corresponding outlet port of the compressor, while in the can-annular type combustor, each can's air intake is open to a common single annulus connected to the compressor outlet. In either case, products of combustion are discharged from each can through a transition duct where they are then distributed around a 360° arc into the first stage of the axial flow turbine section.

Each individual can combustor typically has a combustor chamber fed by one or more air-fuel nozzles disposed about the circumference of an inlet plane of the can combustor in an annular configuration. The air-fuel nozzles introduce air and fuel, commonly with some degree of premixture, into the combustor chamber. In many cases, an air-fuel pilot burner is additionally disposed along the combustor axis. The air-fuel pilot burner, which is employed to enhance combustion stability, may be of either a pre-mix design or a nozzle-mix (i.e., diffusion or non-pre-mix) design. The combination of premix nozzles and pilot burner is collectively denoted herein as the gas turbine burner, and each can combustor includes its own gas turbine burner.

FIGS. 4 and 5, respectively, provide schematic illustration of the gas turbine burner inlet plane for multi-nozzle and annular-nozzle configurations, respectively, each of which uses a central air-fuel pilot burner. In a gas turbine burner 500 as in FIG. 4, multiple discrete premix nozzles 502 are arrayed in an annular configuration around a central air-fuel pilot burner 504, each premix nozzle having a fuel injector that discharges into a corresponding air stream. In a gas turbine burner 510 as in FIG. 5, an annular nozzle 512 includes one or more fuel injectors 516 arranged in an annular configuration surrounded by an air annulus 518 around a central air-fuel pilot burner 514.

SUMMARY

Aspect 1. A combustor for a gas turbine engine including a compressor upstream of the combustor and a turbine downstream of the combustor, the combustor comprising: a combustor chamber; an oxy-fuel pilot burner centrally positioned at an end of the combustor chamber; and an air-fuel premix burner configured to at least partially premix air and fuel, the air-fuel premix burner surrounding the oxy-fuel pilot burner in an annular configuration.

Aspect 2. The combustor of Aspect 1, the oxy-fuel pilot burner comprising: a central fuel nozzle having an outlet end; and an annular oxygen nozzle surrounding the fuel nozzle.

Aspect 3. The combustor of Aspect 2, the oxy-fuel pilot burner further comprising: a pilot burner nozzle positioned to receive flows from the central fuel nozzle and the annular oxygen nozzle, the pilot burner nozzle having a throat, wherein the outlet end of the central fuel nozzle is located upstream of the throat.

Aspect 4. The combustor of any one of Aspects 1 to 4, the oxy-fuel pilot burner comprising: a pilot burner nozzle having a throat; a central nozzle configured to flow a first reactant, the central nozzle having an outlet end located upstream of the throat; and an annular nozzle configured to flow a second reactant; wherein one of the first and second reactants is a fuel, and the other of the first and second reactants is an oxidant.

Aspect 5. The combustor of any one of Aspects 2 to 4, the central fuel nozzle comprising a converging nozzle configured to discharge fuel at the local speed of sound.

Aspect 6. The combustor of Aspect 3 or Aspect 4, wherein the pilot burner nozzle is a converging nozzle terminating at the throat and is configured to discharge an oxy-fuel flame at the local speed of sound.

Aspect 7. The combustor of any one of Aspects 2 to 4, the central fuel nozzle comprising a converging-diverging nozzle configured to discharge fuel at greater than the local speed of sound.

Aspect 8. The combustor of Aspect 3 or Aspect 4, wherein the pilot burner nozzle is a converging diverging nozzle configured to discharge an oxy-fuel flame at greater than the local speed of sound.

Aspect 9. The combustor of any one of Aspects 1 to 8, the air-fuel premix burner comprising a plurality of air-fuel premix nozzles in an annular configuration.

Aspect 10. The combustor of any one of Aspects 1 to 8, the air-fuel premix burner comprising a plurality of fuel injectors; each surrounded by an air annulus.

Aspect 11. A gas turbine engine comprising: an air compressor for compressing air drawn into the gas turbine engine; a combustor as in any one of Aspects 1-10 positioned downstream of the air compressor and configured to combust fuel with compressed air provided by the air compressor to produce high pressure combustion gases; a primary heat exchanger positioned between the compressor and combustor and configured to supply heat to the compressed air provided by the compressor; a heat source; and a heat transfer fluid loop for conveying a heat transfer fluid between the primary heat exchanger and the heat source to transfer heat from the heat source too the compressed air prior to the compressed air entering the combustor.

Aspect 12. The gas turbine engine of Aspect 11, wherein the heat source is a secondary heat exchanger positioned downstream of the turbine and configured to extract heat from turbine exhaust gas; and wherein the heat transfer fluid loop is configured for conveying a heat transfer fluid between the primary heat exchanger and the secondary heat exchanger to transfer heat from the turbine exhaust gas stream to the compressed air prior to the compressed air entering the combustor.

Aspect 13. The gas turbine engine of Aspect 11, wherein the heat source includes a source of waste heat from a furnace or combustion process.

Aspect 14. A method of operating a combustor for a gas turbine engine as in any one of Aspects 1 to 10, comprising: flowing fuel and oxygen to the oxy-fuel pilot burner an oxygen to fuel molar ratio lower than that required for stoichiometric combustion.

Aspect 15. The method of Aspect 14, further comprising operating the oxy-fuel pilot burner at an oxygen to fuel molar ratio of from 30% to 60% of that required for stoichiometric combustion.

Aspect 16. The method of Aspect 14 or Aspect 15, further comprising: computing a total fuel flow to the combustor as the sum of the fuel flowed to the oxy-fuel pilot burner and the fuel flowed to the air-fuel premix burner; and controlling one or more of the fuel flowed to the oxy-fuel pilot burner and the fuel flowed to the air-fuel premix burner such that the fuel flowed to the oxy-fuel pilot burner is less than or equal to 10% of the total fuel flow to the combustor.

Aspect 17. The method of any one of Aspects 14 to 16, further comprising: controlling one or more of the fuel flowed to the oxy-fuel pilot burner and the fuel flowed to the air-fuel premix burner such that the fuel flowed to the oxy-fuel pilot burner is less than or equal to 6% of the total fuel flow to the combustor.

Aspect 18. The method of Aspect 14, further comprising: flowing fuel and air to the air-fuel premix burner; computing an oxygen enrichment level of the combustor; and controlling the oxygen enrichment level to be less than or equal to 0.5%; wherein a total oxidant flow is defined as the sum of the flow rate of oxygen to the oxy-fuel pilot burner and the flow rate of air to the air-fuel premix burner; and wherein the oxygen enrichment level is defined the amount molecular oxygen total oxidant flow divided by the total oxidant flow, minus the concentration of molecular oxygen in the air flowed to the air-fuel premix burner.

Aspect 19. The method of Aspect 18, further comprising controlling the oxygen enrichment level to be less or equal to than 0.3%.

Aspect 20. A gas turbine engine comprising: an air compressor for compressing air drawn into the gas turbine engine; a combustor as in any one of Aspects 1-10 positioned downstream of the air compressor and configured to combust fuel with compressed air provided by the air compressor to produce high pressure combustion gases; and a turbine downstream of the combustor for generating power from the high pressure combustion gases, wherein a pressure ratio across the turbine is greater than or equal to about 20:1; wherein the combustor comprises a combustor chamber, an oxy-fuel pilot burner positioned at an end of the combustor chamber, and an air-fuel premix burner surrounding the oxy-fuel pilot burner in an annular configuration.

Aspect 21. The gas turbine engine of Aspect 20, the oxy-fuel pilot burner comprising: a central fuel nozzle; and an annular oxygen nozzle surrounding the fuel nozzle.

Aspect 22. The gas turbine engine of Aspect 21, the central fuel nozzle comprising a converging nozzle configured to deliver fuel at the local speed of sound.

Aspect 23. The gas turbine engine of Aspect 21, the central fuel nozzle comprising a converging-diverging nozzle configured to deliver fuel at greater than the local speed of sound.

Aspect 24. The gas turbine engine of Aspect 20, the air-fuel premix burner comprising a plurality of air-fuel premix nozzles in an annular configuration.

Aspect 25. The gas turbine engine of Aspect 20, the air-fuel premix burner comprising a plurality of fuel injectors surrounded by an air annulus.

BRIEF DESCRIPTION OF THE DRAWINGS

The present invention will hereinafter be described in conjunction with the appended figures wherein like numerals denote like elements.

DETAILED DESCRIPTION

As described and tested herein, oxygen is introduced into a gas turbine burner in the combustor section of an axial flow gas turbine engine to improve combustion stability of the main premixed air-fuel combustion, thereby expanding the operating envelope and facilitating the reduction of NOx emissions and increase in thermodynamic efficiency. This is accomplished by employing an oxy-fuel burner having certain features as a pilot burner in a gas turbine burner.

Figure 14:
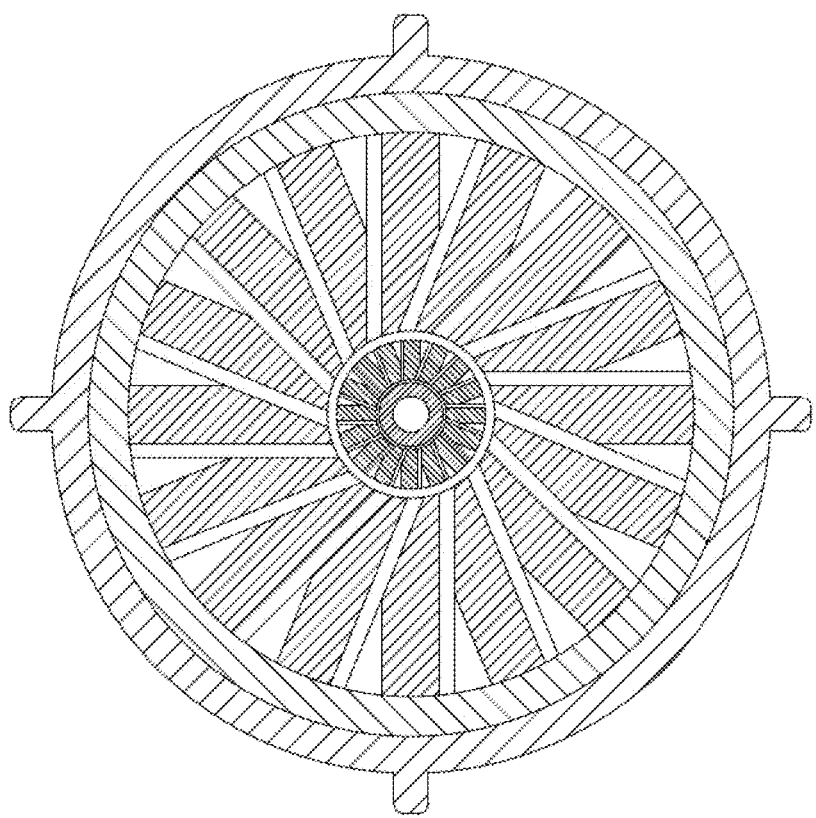
FIG. 14 is a schematic end view of an embodiment of a pilot burner according to the present invention with outer swirl vanes for secondary air.

More specifically, an oxy-fuel pilot burner is located on or near the axis of a can or can-annular gas turbine combustor. In a retrofit of a conventional gas turbine engine already employing an air-fuel pilot burner, the existing air annulus from the air-fuel pilot burner may remain and, if so, while not essential, can be used to flow air surrounding the oxy-fuel burner. In the following description, the combination of the oxy-fuel burner surrounded by the air annulus may be referred to as an oxy-air-fuel pilot burner, even though the oxy-fuel burner operates as the primary burner and the annular "secondary" air may principally provide cooling flow for the pilot burner and incidental combustion oxygen, while also acting to and tailor flame properties, as needed, to optimize mixing between the pilot burner and combustor main air-fuel stream. For example, if the combustor main air fuel nozzle comprises swirl vanes, then the annular air surrounding the oxy-fuel core of the pilot may also include swirl vanes, particularly swirl vanes that generate a circumferential flow in the same direction as the main air-fuel nozzle swirl vanes (see, e.g., FIG. 14).

Improvements in stability can be achieved using an oxygen concentration in the air-oxy-fuel burner as low as 30%. This can be accomplished, for example, by flowing about 13% of the combined oxidant flow in the pilot as pure oxygen in the oxy-fuel burner and the remaining 87% as air in the air annulus (having 20.9% oxygen). Preferably oxygen concentration levels of at least 50% are used, corresponding to flowing about 38% of the combined oxidant flow as oxygen in the oxy-fuel burner and 62% as air in the annulus. The pilot burner may also operate without any air.

Figure 1:
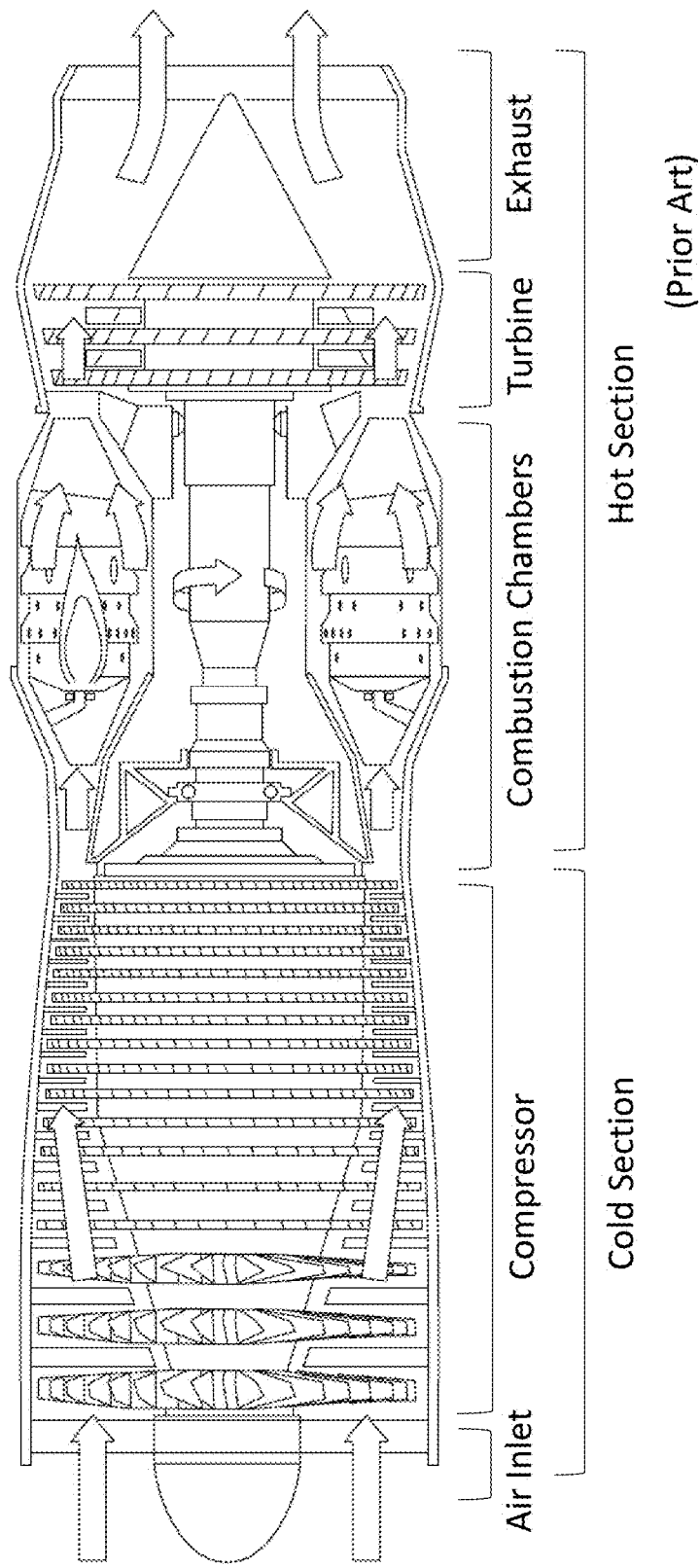
FIG. 1 is a side cross-sectional view of a conventional gas turbine.
Figure 2:
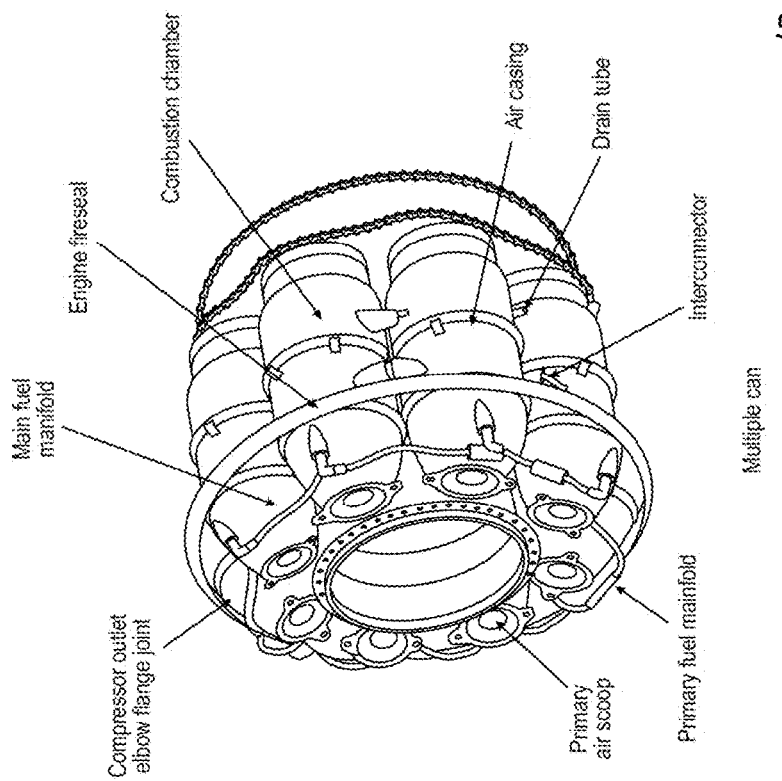
FIG. 2 is a front perspective view of a multiple-can combustor section of a gas turbine as in FIG. 1.
Figure 3:
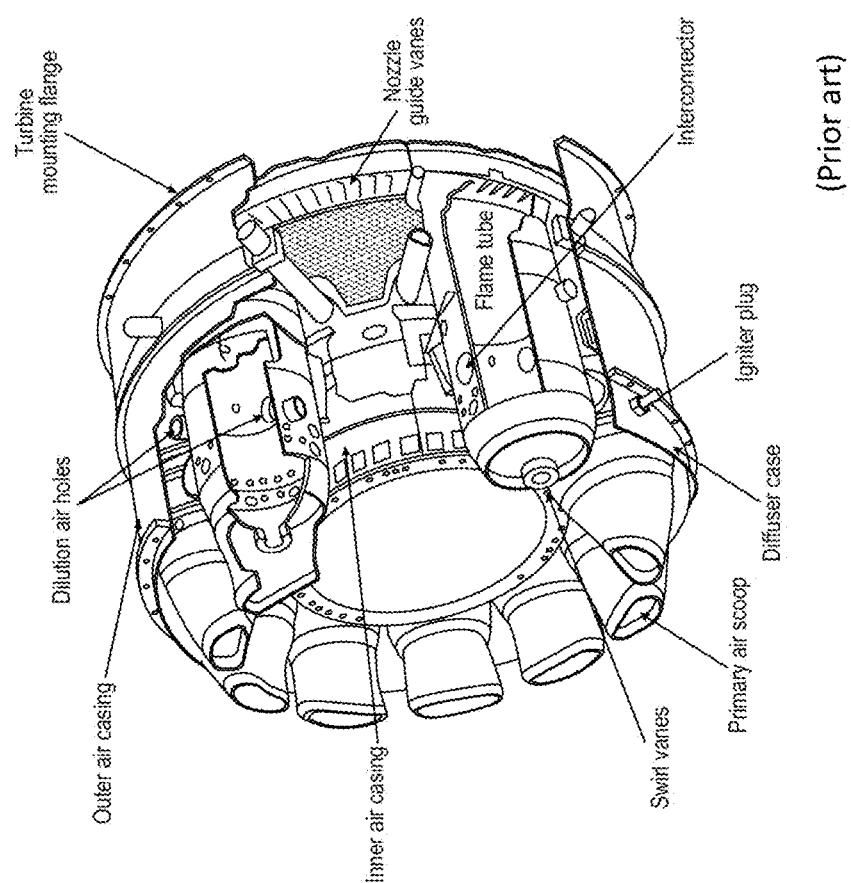
FIG. 3 is a front perspective view of a can-annular combustor section of a gas turbine as in FIG. 1.
Figure 4:
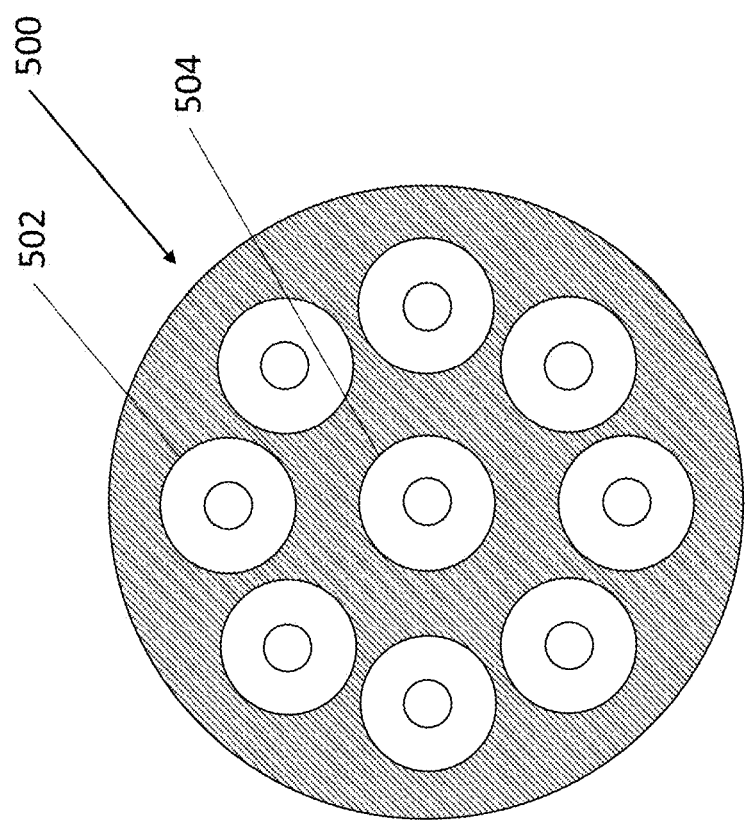
FIG. 4 is a front end schematic view of an embodiment of a gas turbine burner of a can combustor having multiple premix air-fuel nozzles in an annular arrangement, with an air-fuel pilot burner, usable in the configurations of FIGS. 2 and 3.
Figure 5:
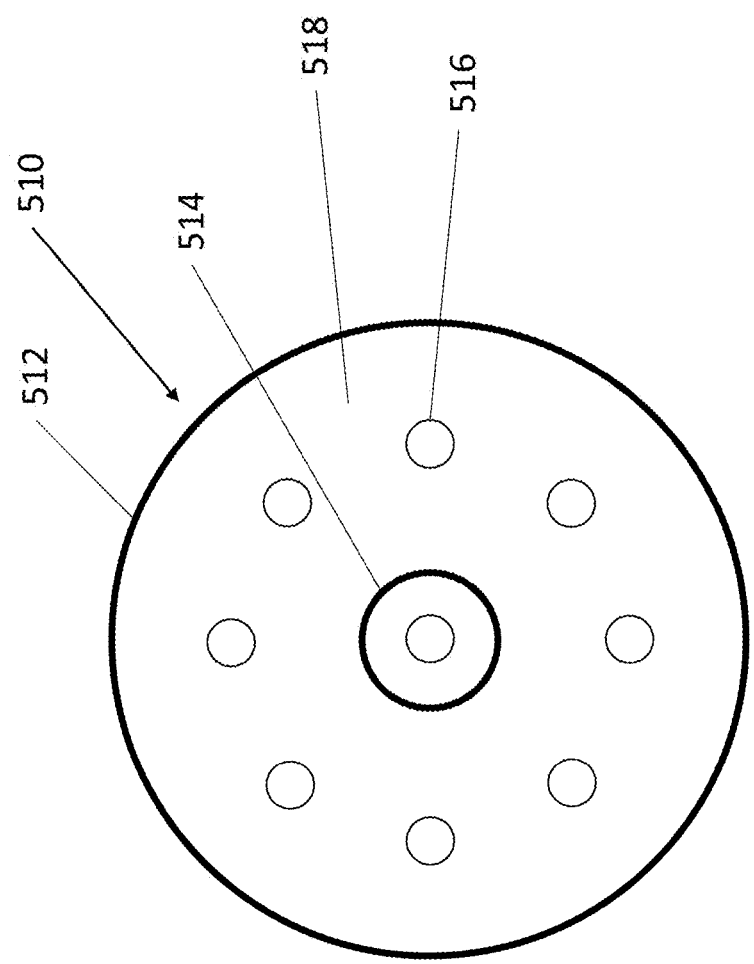
FIG. 5 is a front end schematic view of another embodiment of gas turbine burner of a can combustor having an annular premix air-fuel nozzle arrangement, with an air-fuel pilot burner, usable in the configurations of FIGS. 2 and 3.
Figure 6:
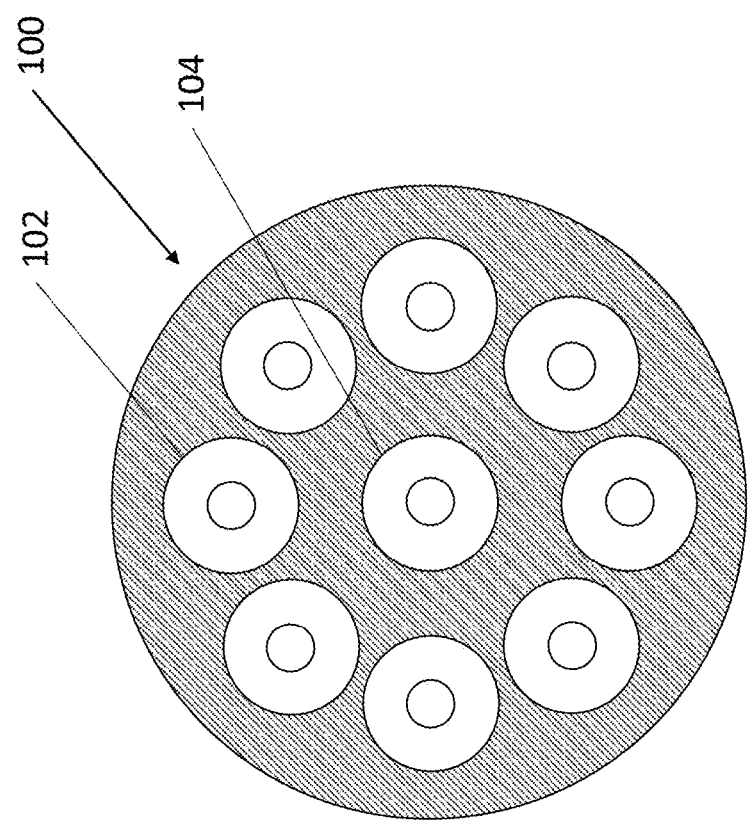
FIG. 6 is a front end schematic view of the embodiment of a gas turbine burner of FIG. 4, using an oxy-fuel pilot burner.
Figure 7:
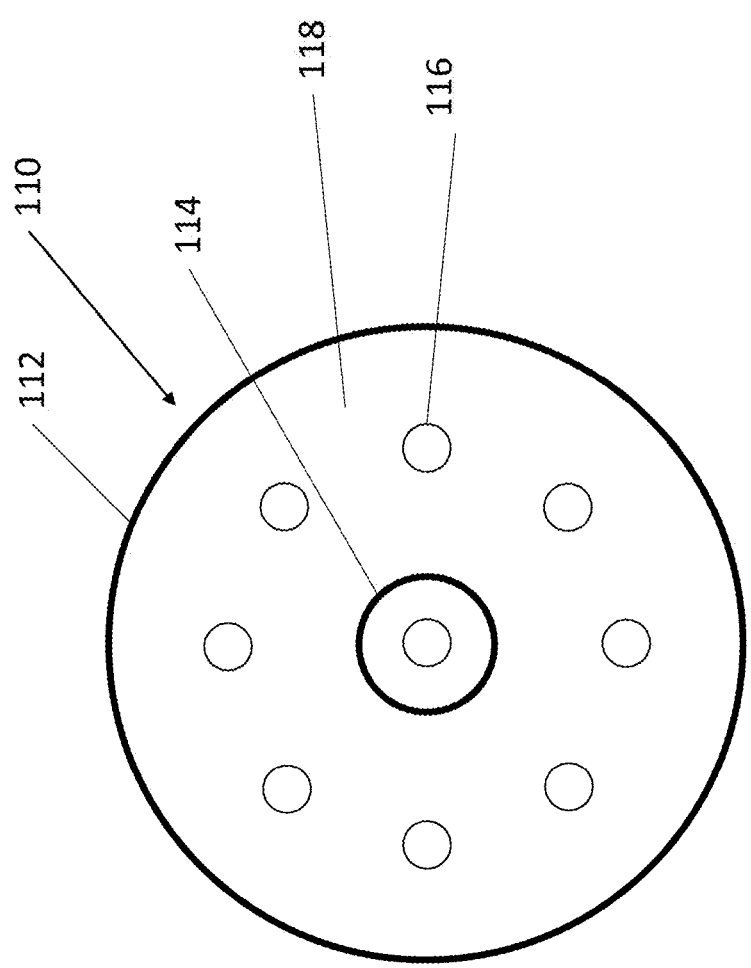
FIG. 7 is a front end schematic view of the embodiment of a gas turbine burner of FIG. 5, using an oxy-fuel burner pilot burner.

FIGS. 6 and 7 show use of an oxy-fuel pilot burner combined with the multi-nozzle and annular nozzle configurations of a gas turbine burner, respectively. In FIG. 6, a pilot burner 100 has a plurality of premix nozzles 102 as in the configuration of FIG. 4, except that a central oxy-fuel burner 104 is provided. Similarly, in FIG. 7, a pilot burner 110 has an annular nozzle 112 with multiple fuel injectors 116 surrounded by an air annulus 118, as in the configuration of FIG. 5, except that a central oxy-fuel burner 114 is provided. Thus, in both configurations, a centrally positioned oxy-fuel burner is used instead of an air-fuel pilot burner to leverage the inherently strong combustion stability of oxy-fuel flames. A centrally positioned oxy-fuel pilot burner creates a flame that is able, when designed and operated specifically for this application, to improve combustion stability of the surrounding air-fuel premixture within the can combustor chamber. This results in beneficial operating conditions of the can combustor that are not attainable using an air-fuel pilot burner.

To make oxygen enrichment economical in a gas turbine engine, the effective oxygen enrichment level in each can combustor (i.e., in each gas turbine burner) is preferably less than or equal to 0.5%, and more preferably less than or equal to 0.3%. As used herein, the oxygen enrichment level is defined as the increase in mole fraction of molecular oxygen in the composite combustion oxidizer (including air in the premix nozzles, secondary air in the annulus, plus oxygen molecules in the industrial grade oxygen supplied to the oxy-fuel pilot burner) that exceeds the mole fraction of oxygen in air alone; for example, a composite oxidizer flow of 99.5% air and 0.5% industrial grade oxygen would have an enrichment level of about 0.4%. Additionally, the fuel introduced through the oxy-fuel pilot burner should be less than or equal to 10% of the total fuel delivered to the can combustor (or gas turbine burner), and preferably less than or equal to 6% of the total fuel.

In an exemplary embodiment, as shown in Table 1 below, the gas turbine burner was operated at a total oxygen enrichment level of about 0.15%, with the air-oxy-fuel pilot burner itself being operated with an oxygen concentration of about 55%, with pure oxygen flow in the oxy-fuel pilot burner surrounded by air in the existing annulus, at a ratio of pure oxygen flow to air flow of about 0.75 (i.e., about 43% of oxidant flow being in oxygen and about 57% of the oxidant flow being in air). This corresponds to an oxygen flow rate to the oxy-fuel pilot burner that is only about 0.19% of the total oxidant flow rate to the gas turbine burner, or about 0.89% of the total molecular oxygen flow rate to the gas turbine burner. At the same time, because the oxy-fuel pilot burner is operated fuel-rich while the air-fuel premix nozzles are operated fuel-lean, about 4.9% of the total fuel in the gas turbine burner was introduced through the oxy-fuel pilot burner.

Gas turbine burners of both the multi-nozzle and annular-nozzle types were tested, and the results of these tests are summarized herein.

Burner Description.

Figure 8:
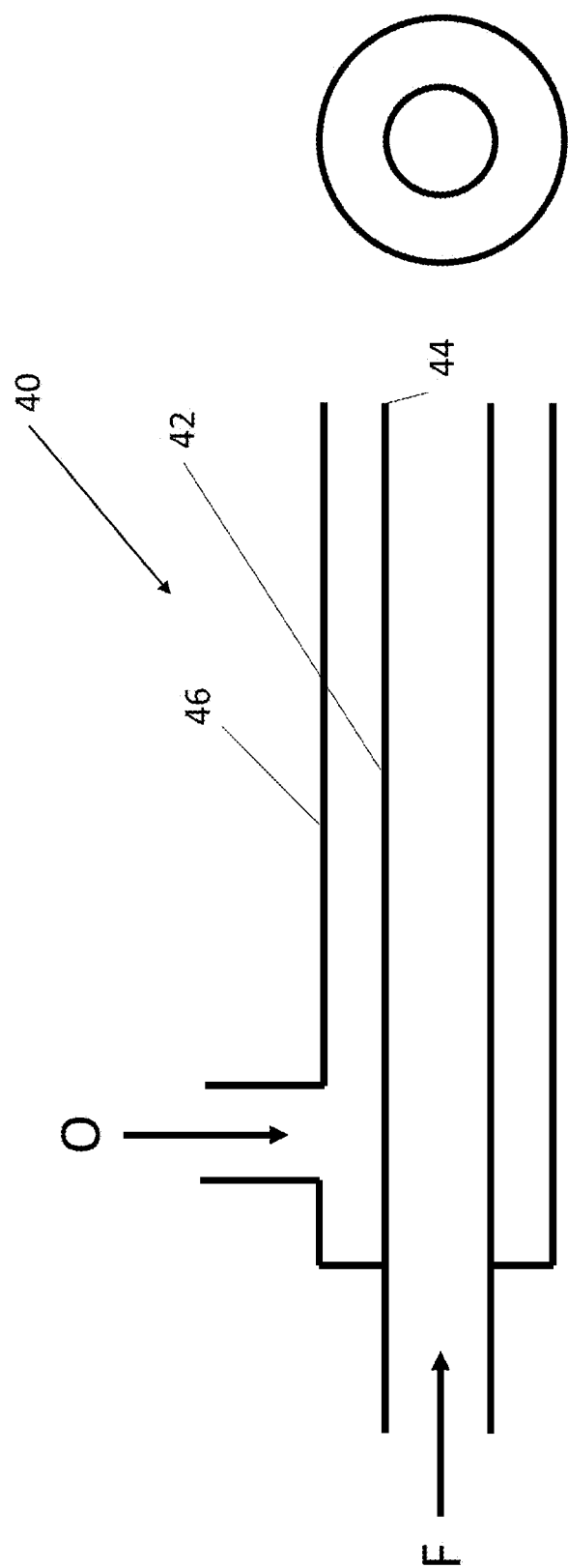
FIG. 8 is a side cross-sectional schematic view and end view of an embodiment of an oxy-fuel pilot burner having a straight nozzle.
Figure 9:
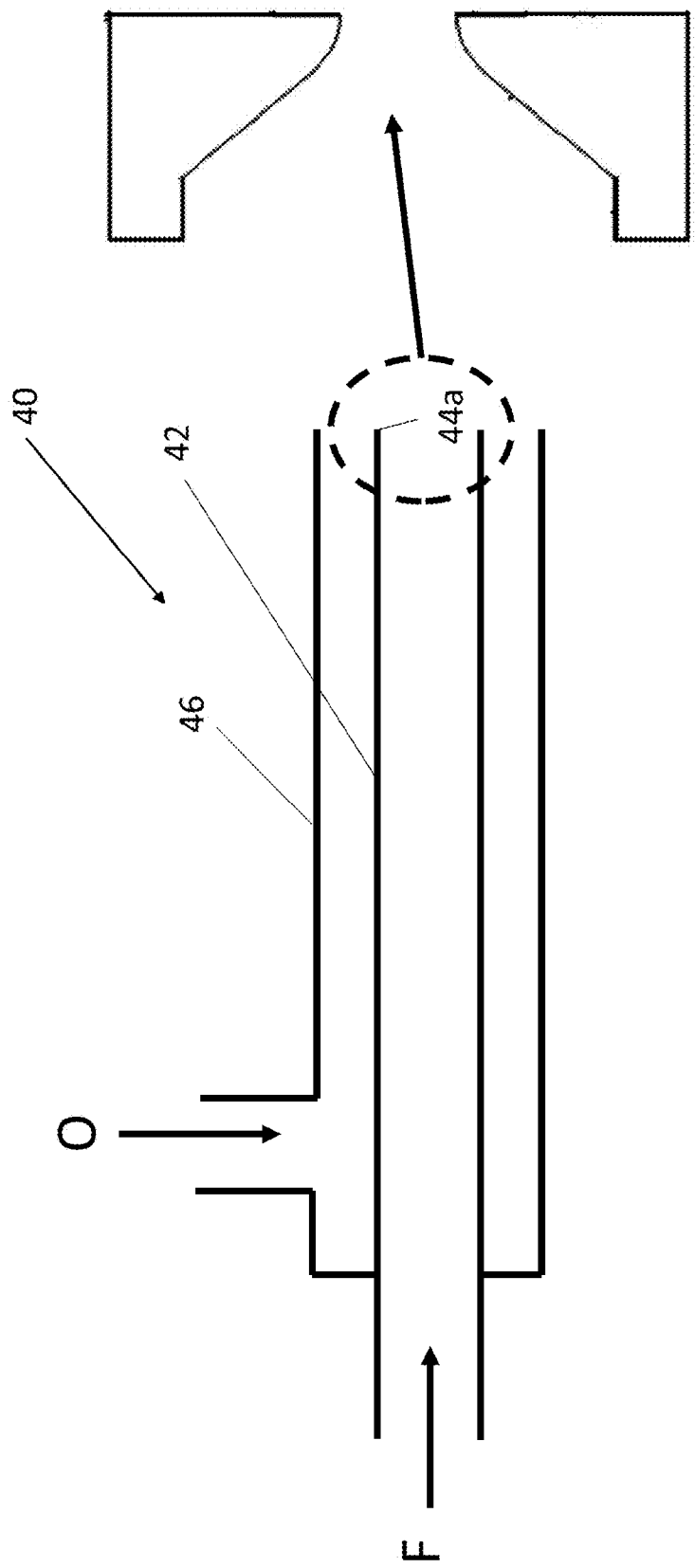
FIG. 9 is a side cross-sectional schematic view and end view of an embodiment of an oxy-fuel pilot burner having a converging nozzle.
Figure 10:
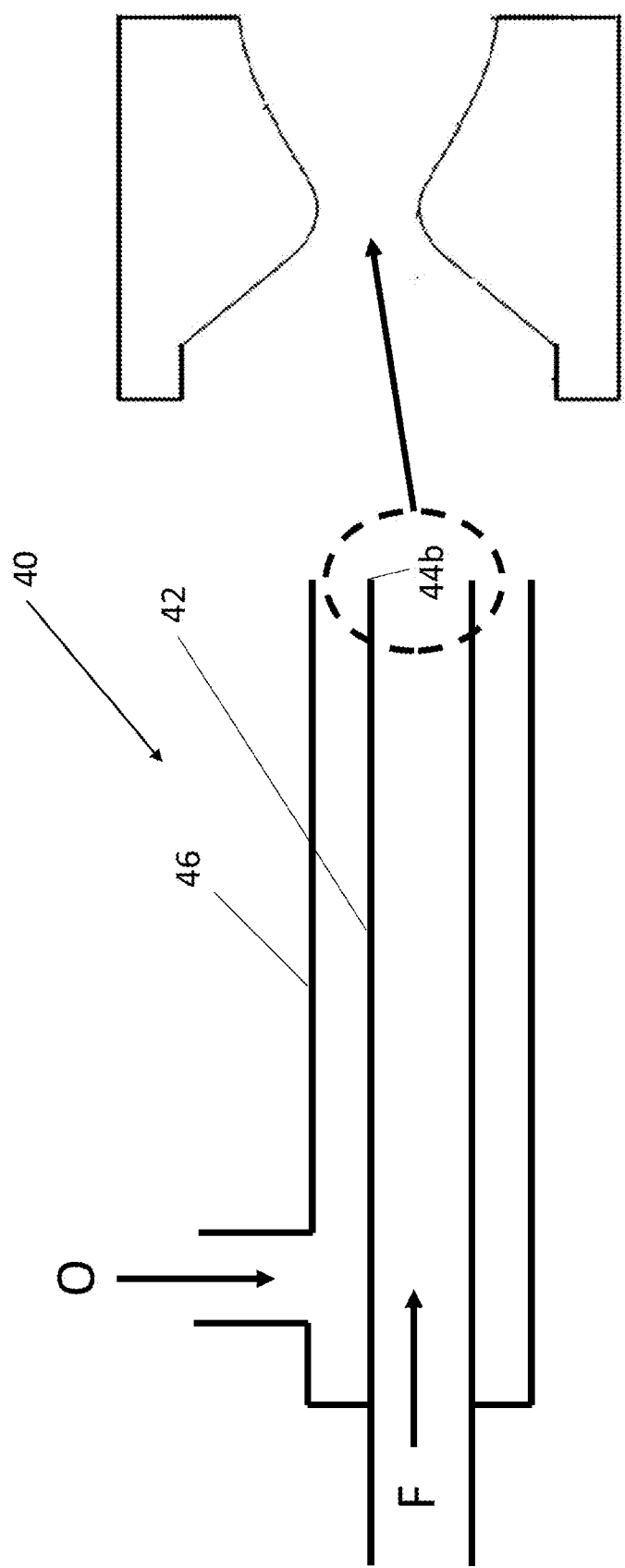
FIG. 10 is a side cross-sectional schematic view and end view of an embodiment of an oxy-fuel pilot burner having a converging-diverging nozzle.

It is expected that a variety of oxy-fuel burners could function as the oxy-fuel pilot burner. One embodiment of an oxy-fuel pilot burner 40 has nozzle-mixed (i.e., non-premixed), co-axial pipe-in-pipe design, with fuel F flowing through a center pipe 42 and oxidant O flowing through a surrounding annular pipe 46, as shown in FIG. 8, with fuel emerging from a fuel nozzle 44. Preferably, the fuel nozzle internal passage is contoured in either a convergent design (FIG. 9, having converging nozzle 44a) or a convergent-divergent design (FIG. 10, having converging-diverging nozzle 44*b*). With sufficient supply pressure, the convergent design enables the fuel velocity exiting the nozzle to be equal to the local speed of sound. In like manner, with sufficient supply pressure, the convergent-divergent design enables the fuel velocity exiting the nozzle to exceed the local speed of sound.

Figure 11:
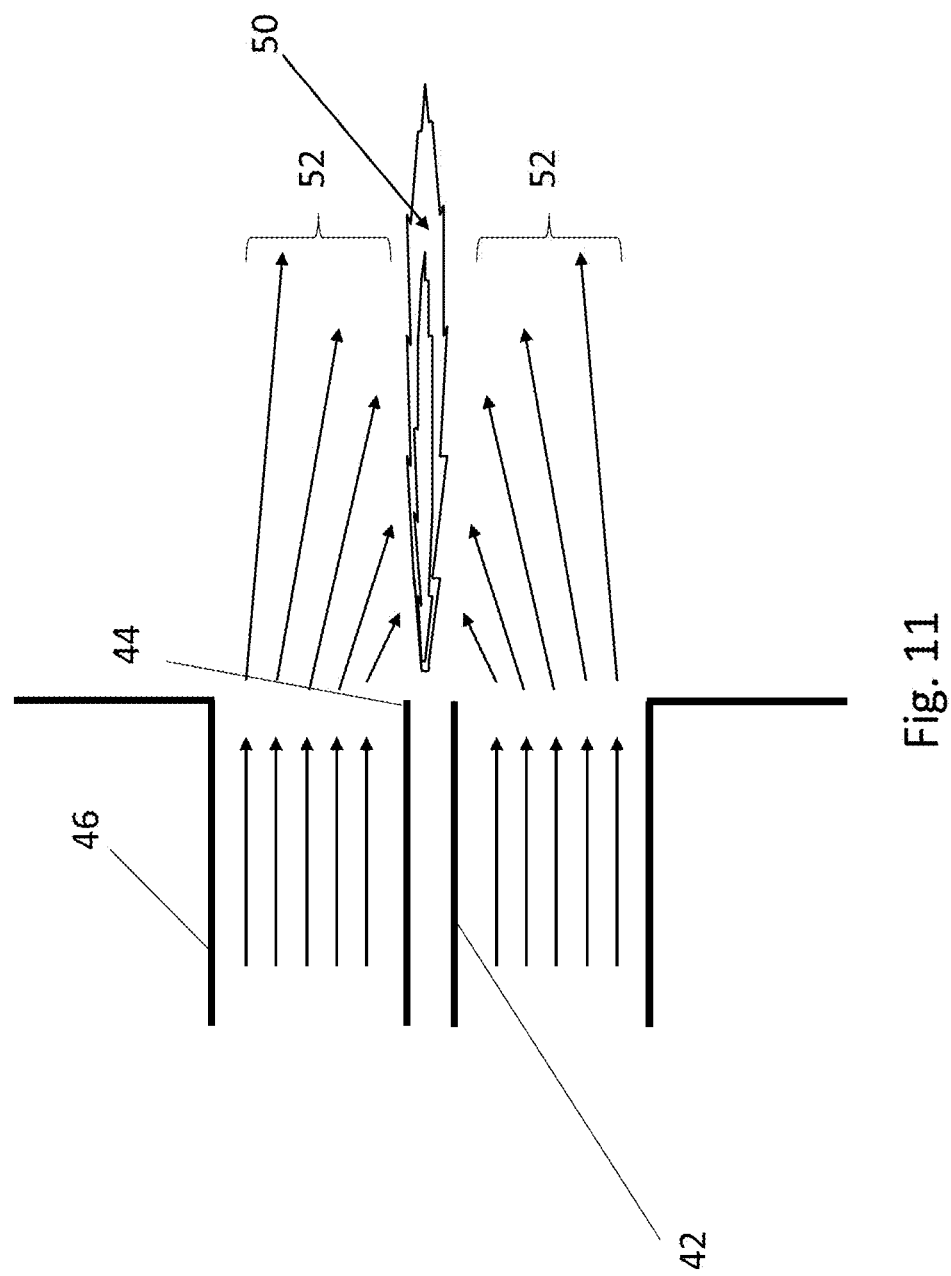
FIG. 11 is a side cross-sectional schematic view of a gas turbine burner of a can combustor as in FIG. 7 or FIG. 8, showing entrainment of an annular premixed air-fuel flame by a central oxy-fuel pilot flame.

An exit fuel velocity that is sonic (Mach 1, or equal to the speed of sound) or supersonic (greater than Mach 1, or greater than the speed of sound) is preferred for two principal reasons. Firstly, it is known that attainment of a nozzle gas exit velocity at or above the speed of sound requires flow at the nozzle "throat" (minimum flow area) to be choked. So-called "choked" flow issuing from a properly designed nozzle is characterized by an insensitivity of nozzle exit flow conditions to upstream propagation of disturbances from within the can combustor. Hence, pressure fluctuations within the combustor cannot affect the flow rate of pilot fuel, thereby further enhancing the stabilizing nature of the pilot burner toward overall combustor operation. Secondly, an exit fuel velocity at or above the local speed of sound ensures that the jet flame issuing from the oxy-fuel pilot burner possesses the dominant velocity within the local flow field (the velocity of the flames issuing from the cans in the annulus are subsonic or at velocities less than the local speed of sound). As such, a pressure deficit formed in the wake of an oxy-fuel pilot jet flame will induce a radially inward deflection of the surrounding flow field streamlines produced by the air-fuel premix nozzles, as illustrated in FIG. 11. In FIG. 11, the arrows 52 qualitatively represent the inward deflection of the air-fuel premix flow field toward the high-velocity oxy-fuel pilot burner flame. This enhances contact between the abundant supply of high-temperature, highly activate flame radicals produced by the oxy-fuel pilot flame and the surrounding air-fuel pre-mixture (and combustion reaction products), which ultimately promotes and strengthens the propagation of chain reactions required for sustained and stable combustion within the can combustor.

In configuring the oxy-fuel pilot burner, several considerations indicated a preference to flow fuel in the central tube or jet, and oxidant in the annulus. Fuel surrounded by oxygen constitutes a normal diffusion flame that is known by those in the art to possess higher inherent stability than so-called inverse diffusion flames (oxygen surround by fuel). Additionally, in order to optimize the efficiency of adding oxygen (or stated differently, to minimize the amount of oxygen necessary to obtain the desired stability and overall combustor efficiency improvements), the oxy-fuel pilot burner will likely operate fuel-rich such that the ratio of oxidant to fuel flow rate will be lower (perhaps significantly lower) than the stoichiometric proportion required for complete combustion. Since the velocity of the central jet controls flame jet momentum, flowing fuel in the central tube is expected to produce a higher momentum flame than flowing oxidant in the center tube.

Figure 15:
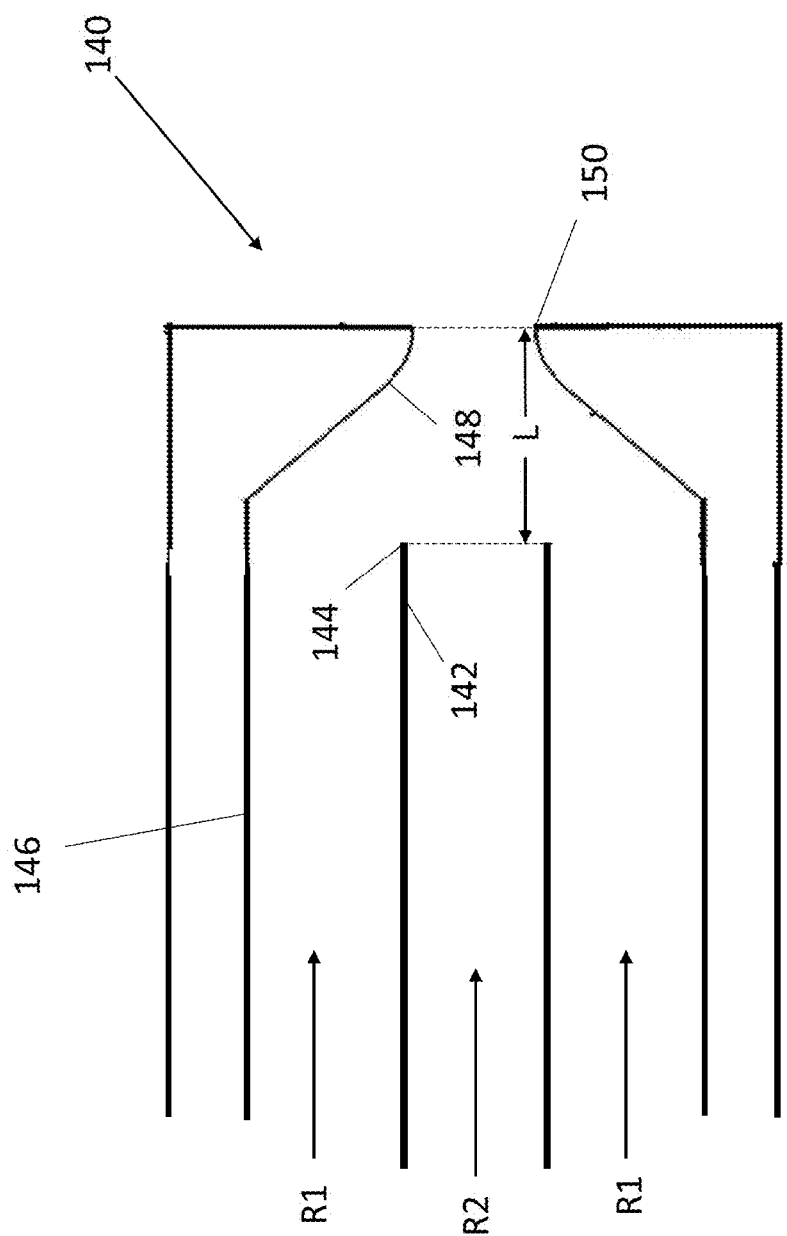
FIG. 15 is a schematic side cross-sectional view of another embodiment of a pilot burner for use in a gas turbine burner, wherein the exit plane of the central conduit is located upstream of the throat of the pilot burner (to facilitate partial premixing and ignition prior to discharge of a flame through the throat).

Another embodiment of the pilot burner 140 is shown in FIG. 15, in which the fuel and oxygen are co-mixed and ignited prior to passing through the nozzle throat. Specifically, a central conduit flowing a first reactant R1 (preferably fuel) is surrounded by an annular conduit 146 flowing a second reactant R2 (preferably oxidant), and the central conduit terminates at a central nozzle 144 that defines an outlet end of the central conduit 142. The fuel and oxidant from the central conduit 142 and the annular conduit 146 flow into a pilot burner nozzle 148 having a throat 150. Importantly, the outlet end or central nozzle 144 of the central conduit 142 is positioned a distance L upstream from the throat 150 of the pilot burner nozzle 148.

Properly designed, a choked, high-temperature, high-velocity reacting jet flame issues from the pilot burner nozzle 148 into the turbine combustor. In addition to the advantageous features of the nozzle-mixed embodiment, this "partially pre-mixed" pilot burner embodiment produces a jet that prevents upstream propagation of combustor disturbances from affecting both the pilot fuel and oxygen flow and thus provides a higher degree of stability enhancement to the combustor. Moreover, the reacting jet may have an "mixed" or average temperature in excess of 1000° C., 1500° C. or higher as it passes through the nozzle throat. Since the speed of sound is proportional to the square root of the (absolute) temperature at the throat, the velocity of the pilot flame can be several times higher than that of the central jet in the nozzle-mixed pilot burner. Hence, the pilot flame from the "partially-premixed" embodiment, due to its much higher throat temperature will possess enhanced reactivity and momentum relative to the nozzle-mixed pilot burner. Safe, long-term operation with the partially-premixed pilot burner is enabled by the nature of how fuel and oxygen are mixed upstream of the throat. In particular, it is necessary that a portion of the reactants, fuel or oxygen, in contact with the throat boundary, remain unreacted as it passes through the throat (i.e., a portion of reactant R2 would hug the outer wall of the conduit 146 and remain unreacted so as to cool the nozzle 148). Those skilled in the art will appreciate that the ways in which this may be achieved are too numerous to even begin to prescribe. Therefore, the only limitation of the geometry of the partially-premixed pilot burner is that the exit plane of the central reactant, whether fuel or oxygen, must be upstream of the throat (see FIG. 15).

It is further advantageous to run the oxy-fuel pilot burner in a fuel-rich operating mode to generate a high percentage of active chemical radicals that contain carbon and/or hydrogen, which can then react advantageously with the air-fuel premixture. This is because the air-fuel premixture in the cans or can-annulus is fuel-lean and therefore possesses an excess of oxygen to better complement the excess of fuel in the oxy-fuel burner mixture.

Test Results.

In a first series of laboratory tests, model can combustors using both the single premix nozzle and multiple air-fuel premix nozzle designs were tested, with and without swirl vanes in the air-fuel premix nozzles. When used, the swirl vanes were designed to impart either a 20° or 40° circumferential swirl angle to the premix flow about the axis of the premix nozzle. Note that in the case of the single premix nozzle configuration, the nozzle axis coincides with each can axis (FIG. 6), while in the multiple premix nozzle configuration, the nozzle axis coincides with the pilot burner axis (FIG. 7). The principal objectives of these tests were as follows.

Testing was conducted to determine stability limits of the can combustors with and without oxygen enrichment. The stability limit is defined herein as the occurrence of one of the following events: (a) large magnitude and/or an unabated increase in pressure oscillations; (b) visibly unstable flame pulsations; (c) large magnitude and/or an unabated increase in carbon monoxide emissions; and/or (d) flame blow-off.

Once the stability limits were determined, testing was conducted to determine NOx emissions at the stability limits.

Additionally, testing was conducted to determine the approximate minimum amount of oxygen and fuel required to produce operation at the stability limits and with certain NOx emissions.

As anticipated, both gas turbine burner types displayed the broadest air-fuel combustion stability when outfitted with 40-degree swirl vanes. Hence, only those results are summarized herein. It was determined, moreover, that both gas turbine burners produced quantitatively similar results. However, since more extensive testing was performed with the multiple premix nozzle configuration, those results are presented herein and used as representative for both burner styles investigated.

Tests were conducted with a composite firing rate (air-fuel premix plus oxy-fuel) of 3 to 5 MMBtu/hr. The combustor pressure was approximately atmospheric during all test runs. The fuel was pipeline natural gas, and the oxygen was vaporized from commercially pure liquid oxygen (LOX). A summary of results is presented in Table 1. Note that the equivalence ratio is defined as the ratio of [(Fuel Flow Rate/Oxygen Flow Rate)$_{ACTUAL}$/(Fuel Flow Rate/Oxygen Flow Rate)$_{STOICHIOMETRIC}$] wherein the oxygen flow rate includes the contribution of oxygen molecules from both air and high purity oxygen. The actual oxygen flow rate refers to actual combustion conditions while the stoichiometric oxygen flow rate refers to theoretical conditions assuming stoichiometric combustion (i.e., exactly enough oxygen to fully combust the hydrocarbon fuel to water and carbon-dioxide). Further, the oxygen enrichment level represents the amount by which the molar oxygen concentration of the composite oxidizer (air plus oxygen) is greater than the molar oxygen concentration of air, in percent oxygen. Finally, the fuel nozzle velocity for the oxy-fuel burner was in all cases equal to the local speed of sound (Mach 1), or approximately 1020 ft/sec. The oxy-fuel pilot burner was typically run at a fuel-rich O2:fuel molar ratio of less than 1.5, where 2.0 is the O2:fuel molar ratio for oxygen-methane combustion; more typically, the oxy-fuel pilot burner was operated at an oxy-fuel ratio of 0.6 to 1.2. Pilot burner oxy-fuel ratios higher than approximately 1.2 did not appear to markedly improve combustion stability, while those lower than approximately 0.6 tended to produce visible soot particles that could be problematic for turbine operation.

TABLE 1

| Parameter | Air-Fuel Combustor (conventional) | With Oxy-Fuel Pilot Burner |
| --- | --- | --- |
| Equivalence Ratio at Combustion Stability Limit | .533 | .398 (minimum tested) |
| NOx Emissions at Stability Limit (lb/MMBtu) | .043 | .032 |
| Oxygen Enrichment Level at Combustion Stability Limit | N/A | .15% |
| Fuel Consumed in Oxy-Fuel Burner | N/A | 5% of total |

Note that in the testing summarized in Table 1, the combustion stability limit was not reached during the oxy-fuel burner test. Therefore, the results presented represent the lowest equivalence ratio (i.e., overall most fuel-lean combustion conditions) at which stable combustion was attained during tested using the available equipment, but it may not be the lowest possible equivalence ratio for stable combustion.

Figure 16:
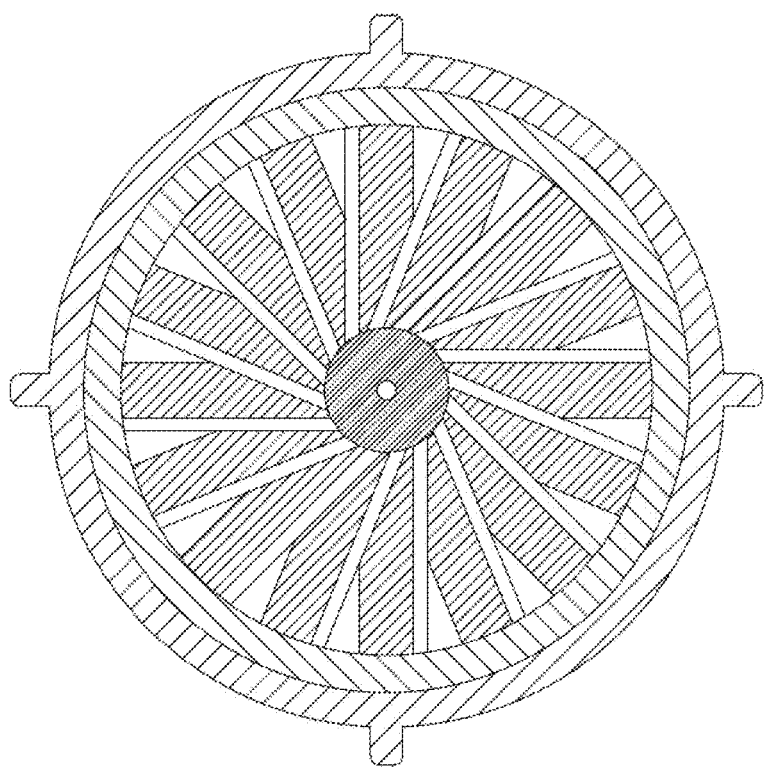
FIG. 16 is a schematic end view of a pilot burner with a single premix nozzle having swirl vanes downstream of the nozzle.

A second series of tests was conducted on a model can combustor with a single air-fuel premix nozzle (see FIG. 16) at a combustor pressure of approximately 120 psig. These tests included high-frequency combustor pressure measurements for enhanced qualitative and quantitative characterization of combustion stability. As with the first series, both the non-premixed and partially premixed pilot burner were tested and produced similar behavior.

Moreover, the overall effect of the inventive pilot burner on extension of combustor stability was found to be similar to that of the atmospheric pressure tests from the first test series. In particular, at similar pilot burner fuel flow rate (approximately 5% of total) and oxygen enrichment level (approximately 0.15%), the equivalence ratio at the lean blow off limit of the combustor, defined by an rms pressure fluctuation greater than 5% of mean pressure, was reduced from approximately 0.58 to at least 0.47. The actual lean blow off limit with the inventive pilot burner in service was not reached due to constraints not associated with the characteristics of the burner.

Figure 17:
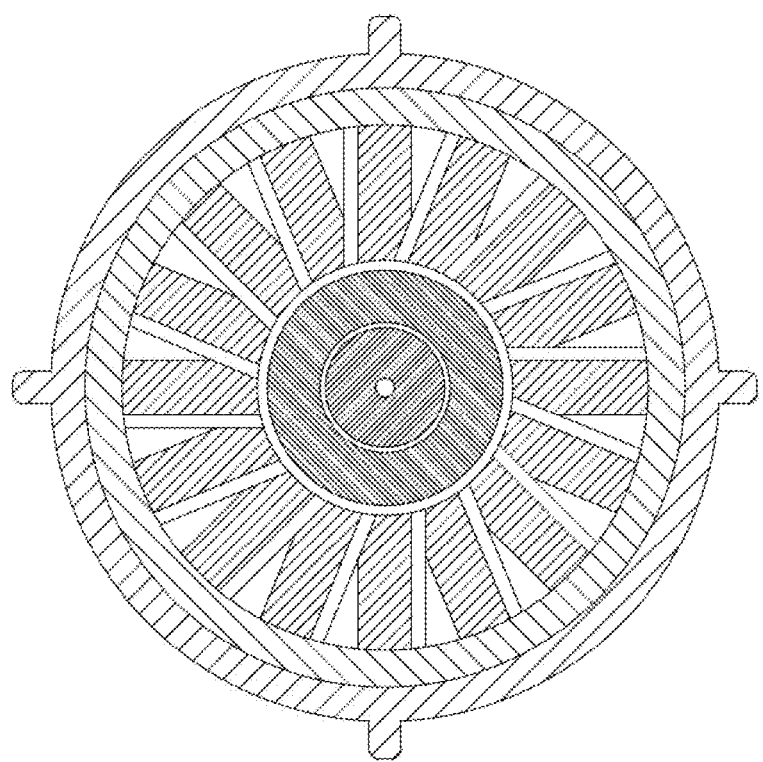
FIG. 17 is a schematic end view of the pilot burner similar to that in FIG. 16 but with another annulus between the pilot burner and the swirl vanes, wherein the annulus immediately surrounding the pilot burner does not have swirl vanes and wherein a single air/fuel premix flow splits, part through outer swirlers and part through non-swirled annulus immediately surrounding pilot burner.
Figure 18:
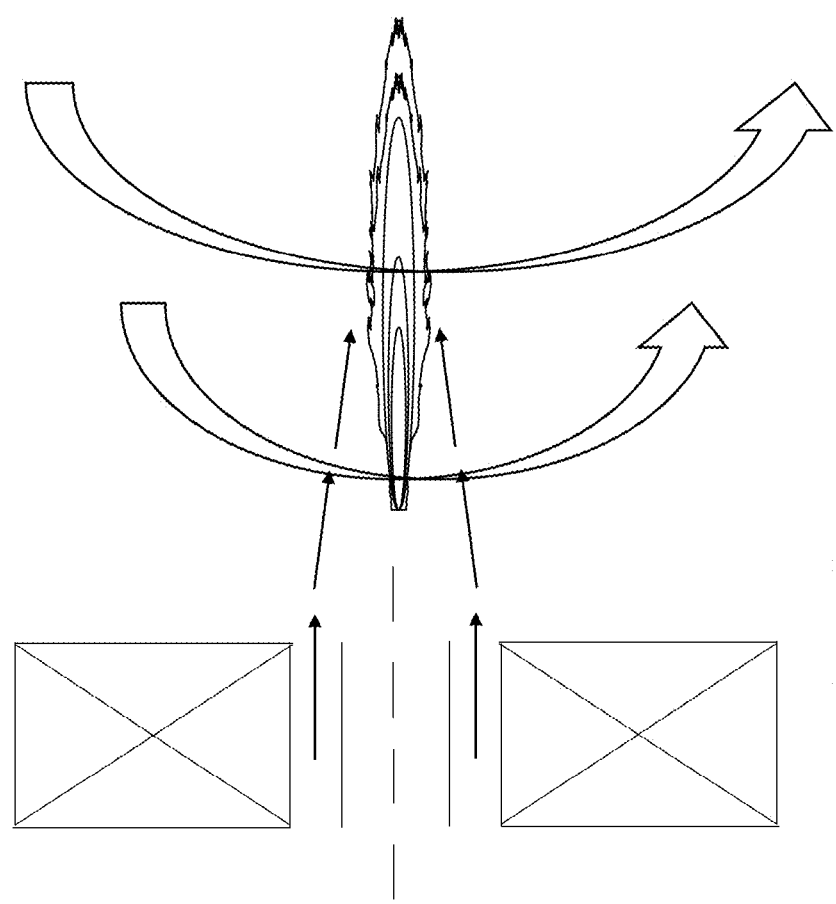
FIG. 18 is a schematic side cross-sectional view of the flow field generated by the gas turbine combustor configuration of FIG. 17.

An additional can combustor nozzle configuration not tested herein is the one illustrated in FIG. 17. This nozzle comprises three basic components; a central pilot burner per the present invention (optionally including a secondary air stream as per the embodiment of FIG. 14), a first (inner) annulus configured to deliver an essentially non-swirled first fraction of the air-fuel mixture around the pilot burner, and an second (outer) annulus configured to deliver the balance of the air-fuel mixture through a series of swirl vanes. The principal distinguishing effect of this nozzle design is that the first portion of the air-fuel mixture entering the combustor through the non-swirled inner annulus is more easily entrained into the high velocity, choked pilot burner flame than the outer swirled fraction. The co-mixing and subsequent reaction of the pilot flame and first air-fuel fraction effectively results in the expansion of the region of influence of the pilot flame as illustrated in FIG. 18. The first fraction of the air-fuel mixture entering the combustor through the first annulus contains preferably between 5 and 25% of the fuel entering the gas turbine combustor.

The laboratory results clearly demonstrate the ability to leverage a relatively small fraction of oxygen to produce a relatively large increase in combustor stability and a relatively large decrease in NOx emissions. The principal benefits of these substantial effects upon gas turbine design and operation are as follows:

(1) Expanded range of combustion stability and lower risk of flame blow-off and large-scale pressure oscillations, among other deleterious consequences of combustion instabilities.

(2) More reliable and risk-free load-following capability for industrial gas turbines whose power output is subject to frequent variations in power demand.

(3) Greater amenability of turbine operation to variations in fuel quality, particularly for gaseous fuels having heating values significantly lower than natural gas that are commonly distributed for industrial use. This includes synthetic gaseous fuel produced from air-fuel gasification processes, which can have heating values as low as approximately 150 Btu/scf.

(4) Operation with lower combustion equivalence ratio than is typically used for conventional air-fuel powered gas turbines, leading to lower turbine inlet temperatures than currently in use in state-of-the-art air-fuel powered gas turbines (which are as high as ~2900-3000° F.), and thereby enabling design of new equipment and cycles, specifically those that incorporate either higher compressor pressure ratio (ratio of air pressure at compressor outlet to air pressure at compressor inlet) or post-compression heat recuperation, and result in lower NOx emissions, as described below in Operating Modes A and B. However, to understand the benefits of these modes, it is helpful to first review some thermodynamic principles of gas turbine performance.

Operation of a modern gas turbine engine follows the Brayton Cycle, which comprises the following steps: a) adiabatic compression; b) constant pressure heat addition (in the combustor); c) adiabatic expansion in the turbine; and d) idealized constant pressure heat removal of gas. Since the gas turbine does not actually run on a cycle, but is rather a steady flow, once-through process, this latter step; i.e. d), does not in practice occur, but is simulated by the fresh charge of air continuously entering the compressor. It is well known by those skilled in the art, that the energy efficiency of a gas turbine operating according to a Brayton Cycle is proportional to the compressor pressure ratio, while the power output is proportional to the absolute temperature of gas entering the turbine expander.

Operating Mode A. Using an oxy-fuel pilot burner to obtain the aforementioned improvements in combustion stability enables the gas turbine engine, and thus the combustor, to operate with a significantly higher air-fuel ratio (i.e., lower equivalence ratio, more fuel-lean operation) than can be achieved solely with air-fuel combustion. All other factors being equal, this more dilute combustion naturally results in lower flame temperature and, hence, lower turbine inlet temperature than that which occurs with solely air-fuel combustion. However, as the combustor inlet air temperature and, hence, turbine inlet temperature, increases with the compressor pressure ratio, one advantageous approach to leveraging the improved combustion stability is to modify the turbine cycle to operate at a higher compressor pressure ratio than used in conventional air-fuel powered gas turbines and, in particular, a compressor pressure ratio that restores the turbine inlet temperature to a level at or near the operating temperature limit used in state-of-the-art air-fuel gas turbines. In one embodiment, a compressor pressure ratio of at least 33:1 can be used (see Table 2). More generally, the compressor pressure ratio increase will be a function of the increase in combustion air-fuel ratio afforded by use of the oxy-fuel pilot burner as described herein.

Figure 12:
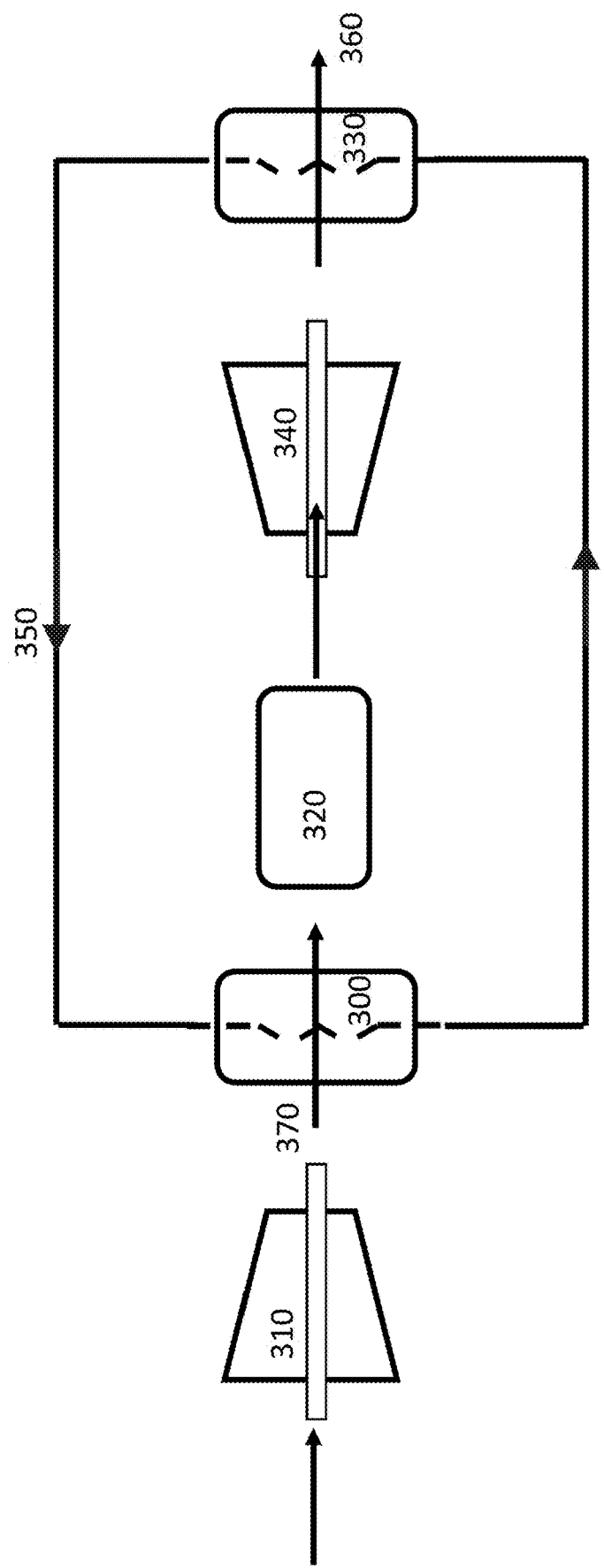
FIG. 12 is a schematic view of an embodiment of a gas turbine using gas turbine burner with an oxy-fuel pilot burner combined with heat exchangers and additional compression upstream of the combustor to match the turbine inlet temperature of a corresponding conventional gas turbine burner using an air-fuel pilot burner, to achieve greater thermal efficiency.
Figure 13:
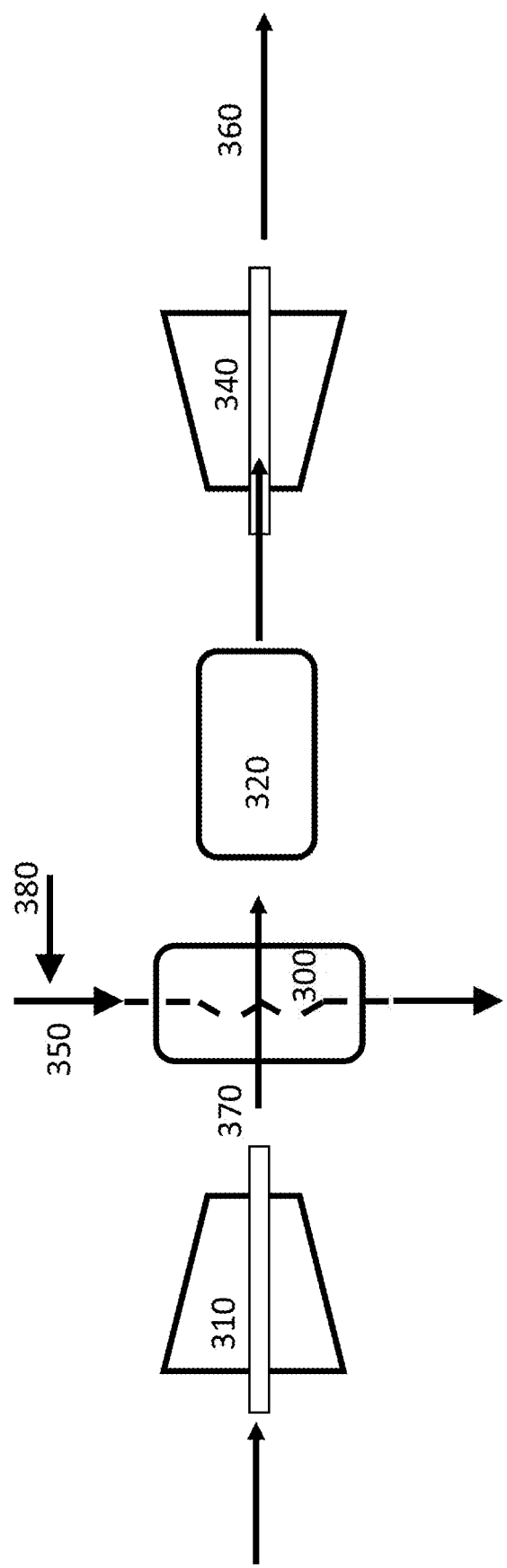
FIG. 13 is a schematic view of an embodiment of a gas turbine using a gas turbine burner with an oxy-fuel pilot burner combined with an input heat exchanger to match the turbine inlet temperature of a corresponding conventional gas turbine burner using an air-fuel pilot burner, to achieve greater thermal efficiency.

Operating Mode B. Using an oxy-fuel pilot burner also enables post-compression heat recuperation to increase the turbine inlet temperature back to the level used in state-of-the-art air-fuel gas turbines. An embodiment of this concept, as shown in FIG. 12, uses a primary heat exchanger situated downstream of the compressor and upstream of the combustor, and a secondary heat exchanger situated downstream of the turbine (expander). The two heat exchangers energetically communicate with one another by means of a heat transfer fluid such as air, water, N2, CO2, or any other heat transfer fluid with suitable thermodynamic properties, wherein the heat transfer fluid recovers thermal energy from the turbine exhaust gas within the secondary heat exchanger and delivers said thermal energy to the compressed air via the primary heat exchanger. It should be understood that there are numerous other embodiments that can be configured to generate a post-compression/pre-combustor increase in air temperature. In general, these would be broadly categorized by a primary heat exchanger (as previously described) through which flows a heat transfer fluid having a temperature, T1, that is higher temperature than the compressor air outlet temperature. The heat transfer fluid may be heated to temperature T1 by a means not connected to the turbine exhaust stream, and in the heat exchanger transfers that thermal energy to the compressed air. See, for example, FIG. 13. Examples of such means include waste heat from adjacent furnace processes and combustion products from direct-firing of waste fuels with air or other suitable oxidizers. Note that the compressor and turbine depicted in both FIG. 12 and FIG. 13 do not necessarily operate using a common shaft.

Using an oxy-fuel pilot burner also enables lower NOx emissions than can be attained in conventional air-fuel powered gas turbines.

TABLE 2

| Case | Approximate Combustor Equivalence Ratio | Combustor Pressure (psig) | Turbine Inlet Temperature (deg F.) | Turbine Thermal Efficiency (Power Output/Fuel Energy Input) |
|---|---|---|---|---|
| Baseline Air-Fuel | 0.6 | 232.8 | 2450 | 38.4% |
| With Oxy-Fuel Pilot Burner | | | | |
| Lower Equivalence Ratio with Higher Combustor Pressure | 0.5 | 478.7 | 2450 | 42.4% |
| Lower Equivalence Ratio with Post-Compression Heat Recuperation | 0.5 | 232.8 | 2450 | 44.9% |

Calculations were performed using commercially-available ASPEN software, programmed with design and operational data relevant to an existing industrial gas turbine generator rated to nominally 180 MW of net power output, to estimate the improved thermal efficiency possible, for example, via the novel design and operating modes suggested in Operating Modes A and B, above. Results of the calculations, summarized in Table 2, indicate roughly a 10% (relative) increase in thermal efficiency over baseline air-fuel operation for Mode A, and a 17% (relative) increase in thermal efficiency over baseline air-fuel operation for Mode B.

Note that the equivalence ratios prescribed in Table 2 differ in magnitude from those obtained during testing and presented in Table 1, and specifically, that the equivalence ratios listed in Table 2 are higher than the respective empirical air-fuel and oxy-fuel equivalence ratios in Table 1, indicating a lower combustion air-fuel ratio. This is because the model calculations were performed prior to completion of the laboratory testing. Because there is a substantially larger disparity between the empirically-obtained air-fuel and oxy-fuel equivalence ratios than for those assumed in the model, it is reasonable to assume that the calculated efficiency gains for the oxy-fuel cases are lower than they would have been if the model calculations had used the empirical equivalence ratios as input.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims

The invention claimed is:

1. A method of operating a combustor for a gas turbine engine including a compressor upstream of the combustor and a turbine downstream of the combustor, the combustor comprising: a combustor chamber; an oxy-fuel pilot burner centrally positioned at an end of the combustor chamber; and an air-fuel premix burner configured to at least partially premix air and fuel, the air-fuel premix burner surrounding the oxy-fuel pilot burner in an annular configuration, wherein the oxy-fuel pilot burner comprises a pilot burner nozzle having a throat; a central nozzle configured to flow a first reactant, the central nozzle having an outlet end located upstream of the throat; and an annular nozzle configured to flow a second reactant; wherein one of the first and second reactants is a fuel, and the other of the first and second reactants is an oxidant; wherein the pilot burner nozzle is a converging nozzle terminating at the throat and is configured to discharge an oxy-fuel flame at the local speed of sound, comprising the steps of:

providing air and fuel at an equivalence ratio to the air-fuel premix burner within the combustor configured to at least partially premix the air and the fuel;

initiating air-fuel combustion in the premix burner;

adjusting one of both of the air flow and the fuel flow to achieve an equivalence ratio in the premix burner of greater than or equal to about 0.5;

initiating a pilot flame by flowing fuel and oxygen to the oxy-fuel pilot burner centrally positioned the combustion chamber of the combustor and surrounded by the premix burner; and adjusting one or both of the air flow and the fuel flow to achieve an overall equivalence ratio in the combustor of less than about 0.5.

2. The method of claim 1, the air-fuel premix burner comprising a plurality of air-fuel premix nozzles in an annular configuration.

3. The method of claim 1, the air-fuel premix burner comprising a plurality of fuel injectors surrounded by an air annulus.

4. The method of claim 1, further comprising operating the oxy-fuel pilot burner at an oxygen to fuel molar ratio of from 30% to 60% of that required for stoichiometric combustion.

5. The method of claim 1, further comprising:

computing a total fuel flow to the combustor as the sum of the fuel flowed to the oxy-fuel pilot burner and the fuel flowed to the air-fuel premix burner; and controlling one or more of the fuel flowed to the oxy-fuel pilot burner and the fuel flowed to the air-fuel premix burner such that the fuel flowed to the oxy-fuel pilot burner is less than or equal to 10% of the total fuel flow to the combustor.

6. The method of claim 1, further comprising:

controlling one or more of the fuel flowed to the oxy-fuel pilot burner and the fuel flowed to the air-fuel premix burner such that the fuel flowed to the oxy-fuel pilot burner is less than or equal to 6% of the total fuel flow to the combustor.

7. The method of claim 1, further comprising controlling an oxygen enrichment level to be less than 0.5%.

8. The method of claim 1, further comprising controlling the oxygen enrichment level to be less than 0.3%.

9. The method of claim 1, wherein the pilot burner is configured to produce a flame having a first velocity equal to the local speed of sound.

10. The method of claim 9, wherein the air-fuel premix burner is configured to produce a flame having a second velocity that is less than the first velocity.

11. A method of operating a combustor for a gas turbine engine including a compressor upstream of the combustor and a turbine downstream of the combustor, the combustor comprising: a combustor chamber; an oxy-fuel pilot burner centrally positioned at an end of the combustor chamber; and an air-fuel premix burner configured to at least partially premix air and fuel, the air-fuel premix burner surrounding the oxy-fuel pilot burner in an annular configuration, wherein the oxy-fuel pilot burner comprises a pilot burner nozzle having a throat; a central nozzle configured to flow a first reactant, the central nozzle having an outlet end located upstream of the throat; and an annular nozzle configured to flow a second reactant; wherein one of the first and second reactants is a fuel, and the other of the first and second reactants is an oxidant; wherein the pilot burner nozzle is a converging diverging nozzle configured to discharge an oxy-fuel flame at greater than the local speed of sound, comprising the steps of:

providing air and fuel at an equivalence ratio to the air-fuel premix burner within the combustor configured to at least partially premix the air and the fuel;

initiating air-fuel combustion in the premix burner;

adjusting one of both of the air flow and the fuel flow to achieve an equivalence ratio in the premix burner of greater than or equal to about 0.5;

initiating a pilot flame by flowing fuel and oxygen to the oxy-fuel pilot burner centrally positioned the combustion chamber of the combustor and surrounded by the premix burner; and adjusting one or both of the air flow and the fuel flow to achieve an overall equivalence ratio in the combustor of less than about 0.5.

* * * * *